United States Patent [19]

Mizoguchi et al.

[11] Patent Number: 5,291,509
[45] Date of Patent: Mar. 1, 1994

[54] GAS LASER APPARATUS

[75] Inventors: Hakaru Mizoguchi, Isehara; Junichi Fujimoto; Yoshiho Amada, both of Hiratsuka, all of Japan

[73] Assignee: Kabushiki Kaisha Komatsu Seisakusho, Tokyo, Japan

[21] Appl. No.: 911,137

[22] Filed: Jul. 9, 1992

[30] Foreign Application Priority Data

Jul. 12, 1991 [JP] Japan .................................. 3-198620

[51] Int. Cl.⁵ .................................................. H01S 3/03
[52] U.S. Cl. ........................................ 372/65; 372/37; 372/58
[58] Field of Search ........................ 372/58, 59, 55, 61, 372/37, 92

[56] References Cited

U.S. PATENT DOCUMENTS 4,899,363  2/1990  Murray et al. ................... 372/58

Primary Examiner—Leon Scott, Jr.
Attorney, Agent, or Firm—Richards, Medlock & Andrews

[57] ABSTRACT

A gas laser apparatus in which a gas medium in a case and a lubricant for bearings supporting a blower for circulating the gas medium are isolated from each other, so that the lubricant can be prevented from mixing into the gas medium while no substantially large resistance is applied to the blower drive. To isolate the gas medium and the lubricant, magnetic fluid shaft seals (10, 11) are used for sealing between the lubricant for the bearings (6) for supporting rotation shafts (3a, 3b) of the blower (3) and the gas medium in the case (1).

18 Claims, 3 Drawing Sheets

GAS LASER APPARATUS

FIELD OF THE INVENTION

This invention relates to a gas laser apparatus using a medium gas.

BACKGROUND OF THE INVENTION

FIG. 4 shows a cross section of a conventional gas laser apparatus, and FIG. 5 shows a cross section taken along the line H—H of FIG. 4. A case 51 shown in FIGS. 4 and 5 is closed with a cap 52. The case 51 and the cap 52 are each formed of an insulating material. A gas medium is enclosed in a chamber defined by the case 51 and the cap 52. A certain voltage is applied between a cathode 58 and an anode 59 to cause electric discharge therebetween and to thereby generate laser light. The generated laser light is emitted out of the case 51 through a window 60 formed in the case 51, as indicated by arrow K.

A blower 53 serves to circulate the gas medium in the case 51 as indicated by arrows D and E. A heat exchanger 61 constituted of a plurality of pipes serves to cool the gas heated by the discharge. The blower 53 has shafts 53a and 53b for its rotation. The shafts 53a and 53b are supported on bearings 56 and 57 which are in turn supported on bearing boxes 54 and 55. Grease or oil which does not easily evaporate is used as a lubricant for lubricating the bearings 56 and 57.

There is a problem to be solved in this conventional apparatus. That is, the lubricant such as grease or oil is not only evaporated but is also released from the bearings as small particles having a size of several microns to be diffused in the gas medium in the case 51. The lubricant diffused in the case 51 is decomposed by electric discharge into materials which are impurities in the gas medium, so that the life of the gas medium is shortened. In particular, in the case of an excimer laser apparatus using halogen gas having high reactivity, such impurities react with the halogen gas to produce halides which badly influence the performance of the apparatus in such a manner as to impede laser oscillation and to reduce the life of the gas medium.

SUMMARY OF THE INVENTION

One of the most essential features of the present invention resides in using a magnetic fluid for sealing as a means for isolating a gas medium in a case and a lubricant for bearings from each other. The use of the magnetic fluid enables prevention of mixing of the lubricant into the gas medium in the case, without causing any resistance which would considerably influence the blower drive.

BRIEF DESCRIPTION THE DRAWINGS

FIG. 1 cross-sectional view of a gas laser apparatus with an embodiment of the present invention;

DESCRIPTION OF THE PREFERRED EMBODIMENT

Figure 1:
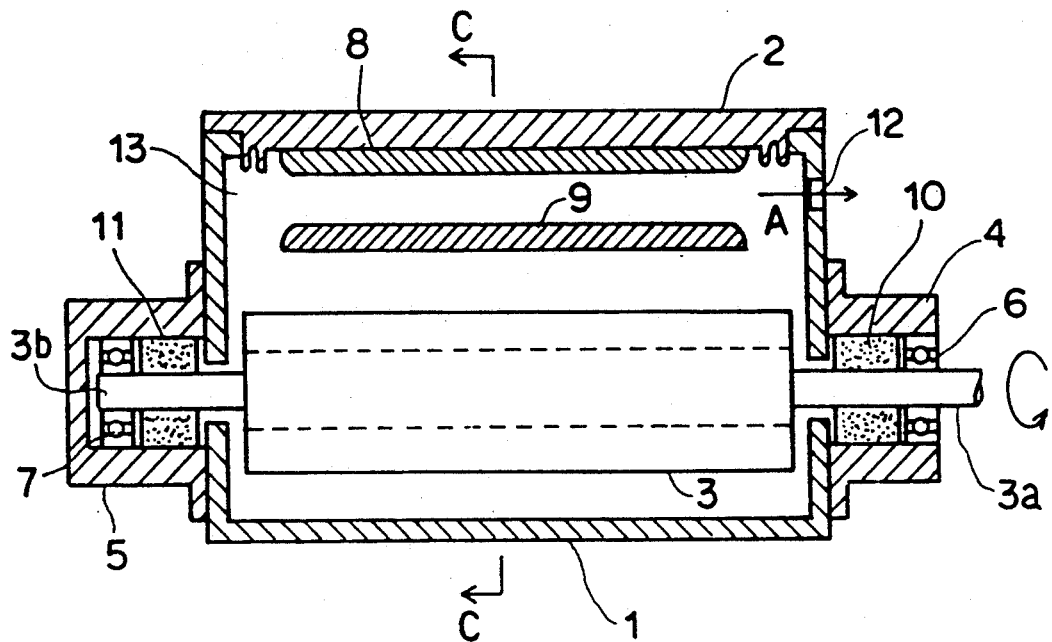
Figure 4:
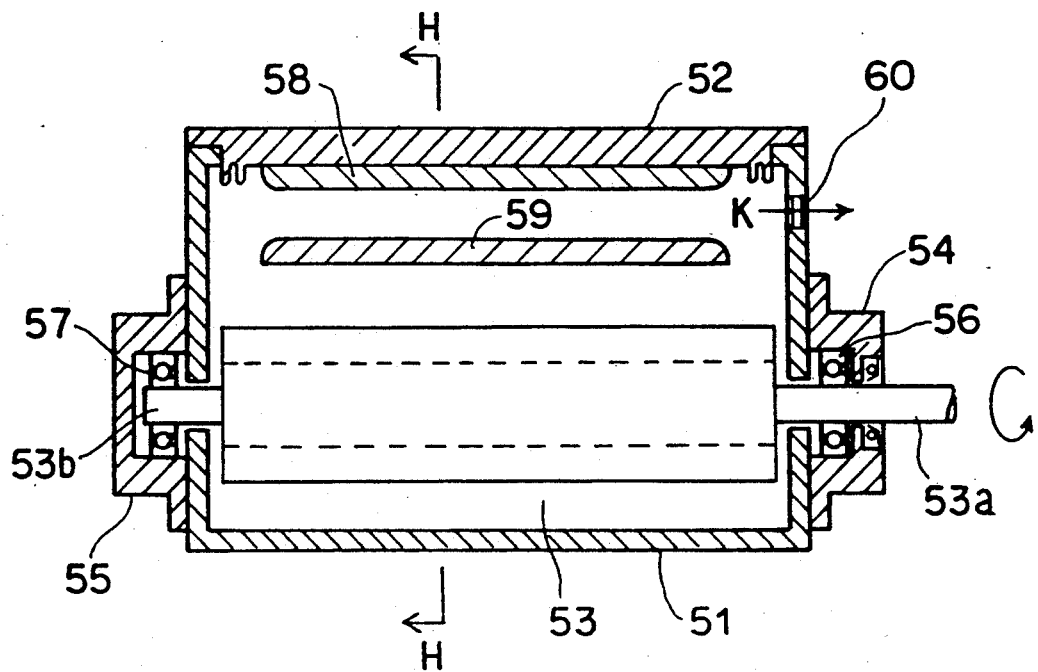
FIG. 4 is a cross-sectional view of a conventional gas laser apparatus.
Figure 5:
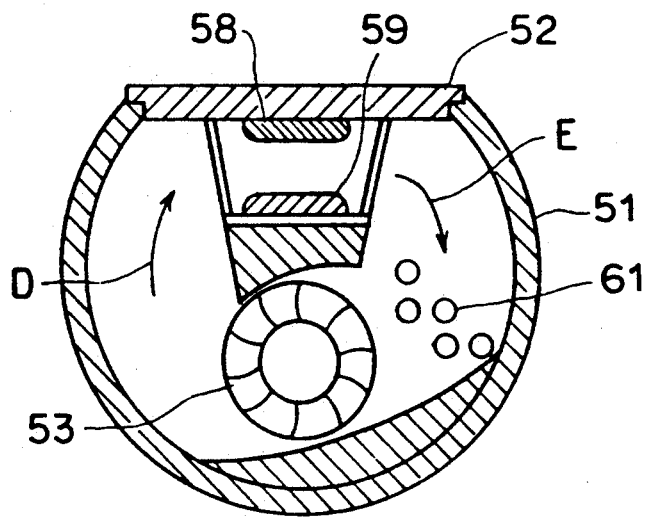
FIG. 5 is a cross-sectional view taken along the line H—H of FIG. 4 and is the same as a cross section taken along the line C—C of FIG. 1.

FIG. 1 is a cross-sectional view of an embodiment of the present invention which has the same cross section along the line C—C as that shown in FIG. 5 taken along the line H—H of FIG. 4. A case 1 shown in FIG. 1 is closed by a cap 2. The case 1 and the cap 2 are each formed of an insulating material. A gas medium 23 is enclosed in a chamber defined by the case 1 and the cap 2. A certain voltage is applied between a cathode 8 and an anode 9 to cause electric discharge therebetween and to thereby generate laser light. The generated laser light is emitted out of the case 1 through a window 12 formed in the case 1, as indicated by arrow A.

A blower 3 has shafts 3a and 3b for its rotation. Each of the shafts 3a and 3b is fixed to the blower 3. To support the blower 3, the shaft 3a is fitted in a bearing 6 housed in a bearing box 4 while the shaft 3b is fitted in a bearing 7 housed in a bearing box 5. Each of the bearing boxes 4 and 5 is fixed to the case 1 as shown in FIG. 1.

Figure 2:
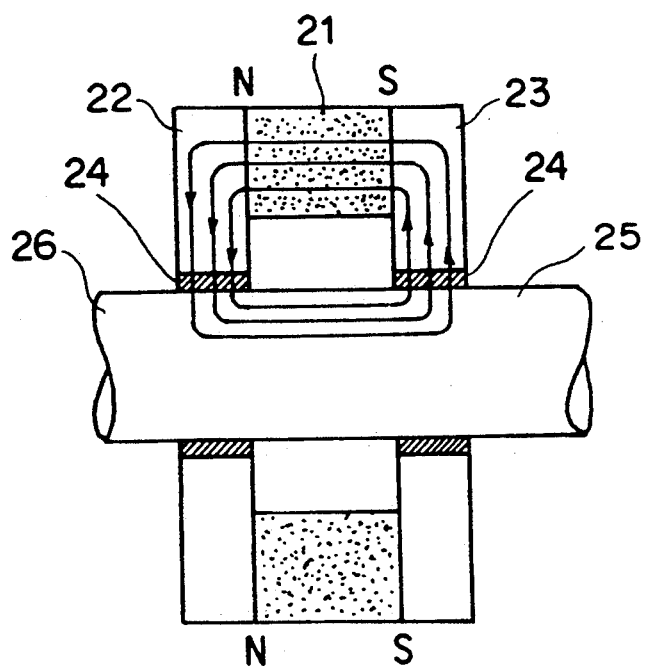
FIG. 2 is a diagram of the principle of the operation of a magnetic fluid shaft seal in accordance with the present invention.

Magnetic fluid shaft seals 10 and 11 are respectively fitted around the shafts 3a and 3b in the bearing boxes 4 and 5 and between the bearings 6 and 7 and the blower 3. FIG. 2 shows the principle of the operation of the magnetic fluid shaft seals 10 and 11, and FIG. 3 shows the structure of an example of the magnetic shaft seal 10.

In FIG. 2, an annular cylindrical permanent magnet 21, disk-like annular pole plates 22 and 23, a magnetic fluid 24 and a shaft 26, corresponding to the shaft 3a or 3b shown in FIG. 1, are illustrated. In this arrangement, a magnetic circuit 25 is formed and the magnetic fluid 24 is retained between the shaft 26 and the pole plates 22 and 23 by the magnetism, as illustrated.

Figure 3:
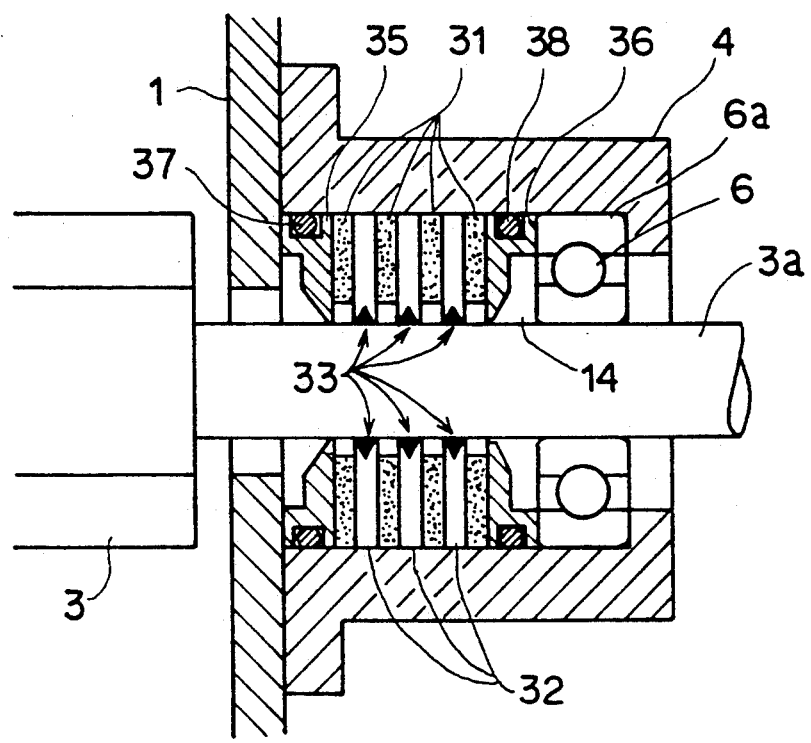
FIG. 3 is a diagram of the structure of an example of the magnetic fluid shaft seal in accordance with the present invention.

FIG. 3 shows the structure of the magnetic fluid shaft seal 10 constructed based on this principle. As shown in FIG. 3, disk-like annular permanent magnets 31 and disk-like annular pole plates 32 are fixed on internal portions of a bearing box 4 along with an outer race 6a of a bearing 6 and holder plates 35 and 36. A magnetic fluid is provided as indicated by 33. The holder plates 35 and 36 are provided with outer circumferential seals 37 and 38. A blower 3, a shaft 3a and the bearing 6 are the same as those illustrated in FIG. 1. That is, the magnetic fluid shaft seal 10 is formed of the above-described members 31 to 38. The magnetic fluid 33 is retained between the shaft 3a and the pole plates 32 as in the operation principle described above with reference to FIG. 2 to achieve sealing between the blower 3 and the bearing 6, thereby preventing contact between gas medium 13 on the blower side and lubricant 14 on the bearing 6 side or mixing of fine particles of lubricant 14 into gas medium 13. The construction of the other magnetic fluid shaft seal 11 shown in FIG. 1 is the same as the above-described construction of the magnetic fluid shaft seal 10. Therefore the lubricant in the bearing 7 can also be prevented from contacting the gas medium 13. The resistance of the magnetic fluid shaft seal to the rotation of the shaft is not so large as to impede the rotation.

As described above, in the gas laser apparatus in accordance with the present invention, a magnetic fluid shaft seal is provided between the medium gas and the lubricant of the bearing to prevent contact between the gas medium and the lubricant and, hence, deterioration in the medium gas. It is thereby possible to remarkably extend the life of the medium gas.

What is claimed is:

1. A gas laser apparatus comprising:
    a gas medium;
    a case in which the gas medium is enclosed;
    a blower for circulating the gas medium within said case, said blower having a rotation shaft;
    a bearing supporting said rotation shaft, said bearing containing a lubricant;
    an anode and a cathode positioned in said case for generating laser light; and
    a magnetic fluid shaft seal positioned about said rotation shaft and providing a seal between the gas medium in said case and said lubricant in said bearing so as to isolate said lubricant from said gas medium.

2. A gas laser apparatus according to claim 1, wherein said magnetic fluid shaft seal comprises at least one annular disk-like magnet mounted in a bearing box, annular disk-like pole plates, holder plates provided on opposite sides of a set of said magnet and said pole plates, and a magnetic fluid.

3. A gas laser apparatus according to claim 2, wherein said magnetic fluid is retained by a magnetism between said rotation shaft of said blower and said disk-like pole plates mounted in said bearing box.

4. A gas laser apparatus comprising a case having a chamber for containing a gas medium, an anode and a cathode positioned in said chamber for generating laser light, a blower associated with said case for circulating a gas medium in said chamber, said blower being mounted on a shaft, at least one bearing for supporting said shaft, each said bearing containing a lubricant for the respective bearing, and at least one magnetic fluid shaft seal associated with each said bearing to isolate the lubricant in the respective bearing from the gas medium in said chamber.

5. A gas laser apparatus according to claim 4, wherein each said magnetic fluid shaft seal comprises at least one annular magnet positioned coaxially about said shaft, with each said annular magnet being positioned between a pair of annular pole plates, each annular pole plate being positioned coaxially about said shaft, and a magnetic fluid positioned between said pole plates and said shaft.

6. A gas laser apparatus according to claim 5 wherein each said magnetic fluid shaft seal further comprises first and second annular holder plates positioned at opposite ends of the respective magnetic fluid shaft seal to retain the at least one annular magnet and the associated annular pole plates of the respective magnetic fluid shaft seal therebetween.

7. A gas laser apparatus according to claim 6 wherein each said magnetic fluid shaft seal comprises a plurality of annular magnets.

8. A gas laser apparatus according to claim 7 wherein each annular magnet is a permanent magnet.

9. A gas laser apparatus according to claim 8 wherein said case has at least one bearing housing, each said bearing housing containing a bearing for supporting said shaft, and wherein each magnetic fluid shaft seal is positioned in a respective bearing housing so as to isolate the lubricant in the respective bearing from the gas medium in said chamber.

10. A gas laser apparatus according to claim 9 wherein said shaft is rotatably mounted in at least two of the bearings for supporting said shaft.

11. A gas laser apparatus according to claim 9 wherein each of said first and second annular holder plates is provided with an annular seal positioned between the respective annular holder plate and the associated bearing housing.

12. A gas laser apparatus according to claim 11 wherein said shaft is rotatably mounted in at least two of the bearings for supporting said shaft.

13. A gas laser apparatus according to claim 12 wherein said blower is mounted within said chamber.

14. A gas laser apparatus according to claim 4 wherein each said magnetic fluid shaft seal comprises a plurality of annular magnets.

15. A gas laser apparatus according to claim 14 wherein each annular magnet is a permanent magnet.

16. A gas laser apparatus according to claim 4 wherein said case has at least one bearing housing, each said bearing housing containing a bearing for supporting said shaft, and wherein each magnetic fluid shaft seal is positioned in a respective bearing housing so as to isolate the lubricant in the respective bearing from the gas medium in said chamber.

17. A gas laser apparatus according to claim 4 wherein said shaft is rotatably mounted in at least two of the bearings for supporting said shaft.

18. A gas laser apparatus according to claim 4 wherein said blower is mounted within said chamber.

* * * * *